Dec. 23, 1958 C. H. FALLERT 2,865,128
ROD ACCESSORY FOR FISH HOOKS AND LEADERS
Filed May 13, 1957 2 Sheets-Sheet 1
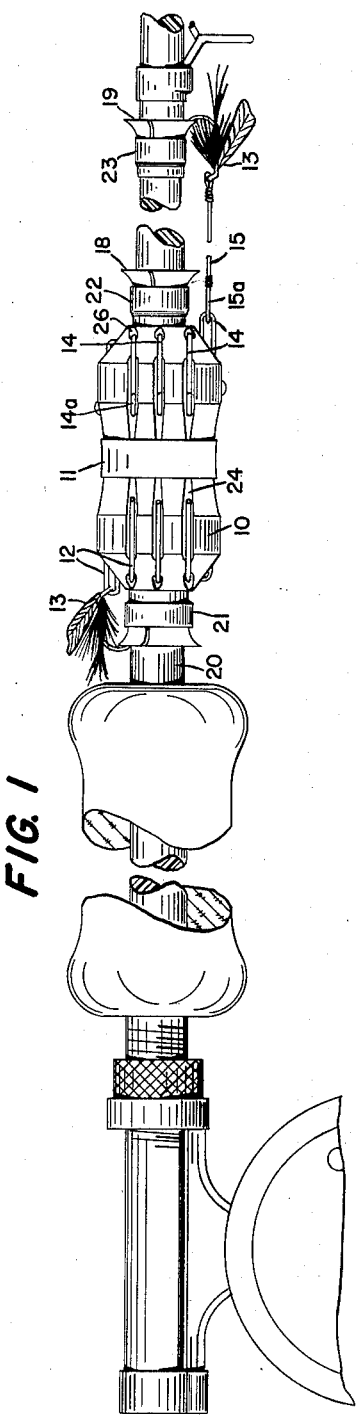
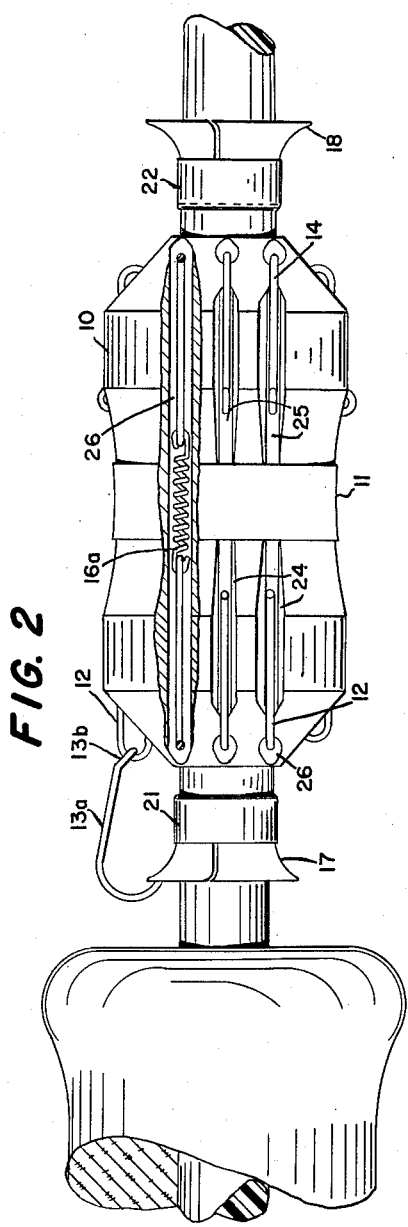
INVENTOR.
Charles H. Fallert
BY Dec. 23, 1958  C. H. FALLERT  2,865,128
ROD ACCESSORY FOR FISH HOOKS AND LEADERS
Filed May 13, 1957  2 Sheets-Sheet 2
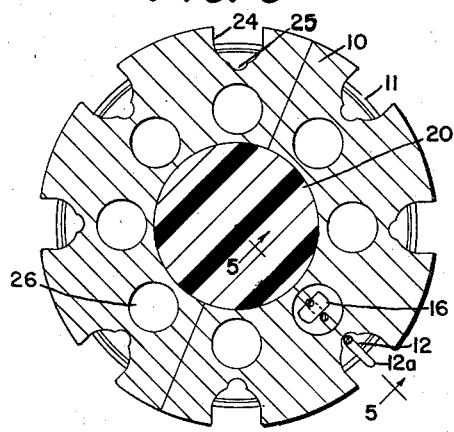
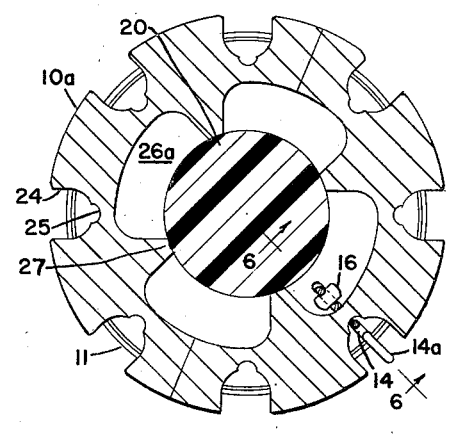
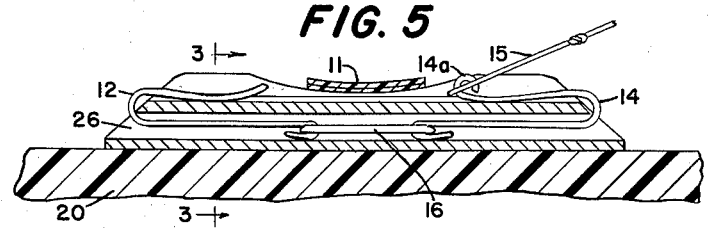
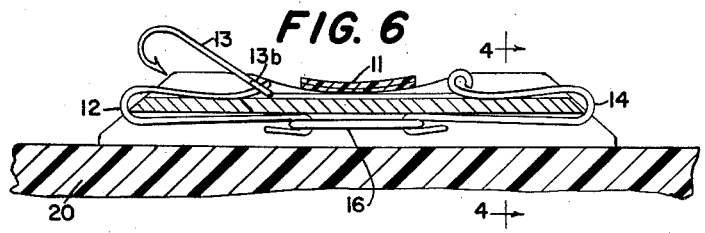
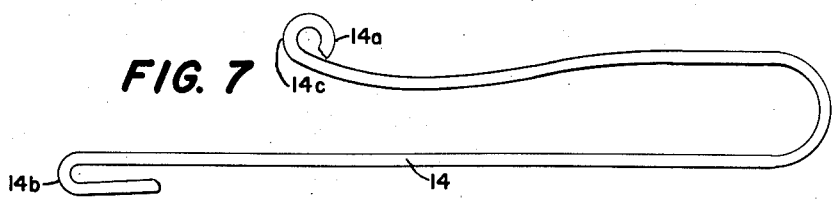
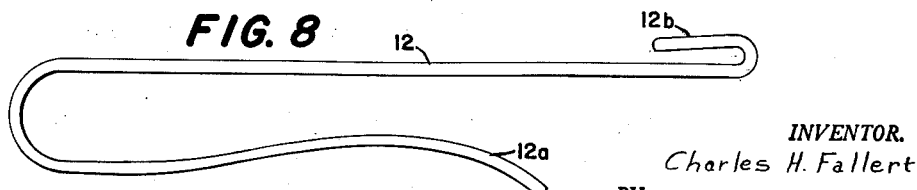
INVENTOR.
Charles H. Fallert
BY

United States Patent Office 2,865,128
Patented Dec. 23, 1958

2,865,128
ROD ACCESSORY FOR FISH HOOKS AND LEADERS

Charles H. Fallert, Sunnyside, Wash.

Application May 13, 1957, Serial No. 658,637

7 Claims. (Cl. 43—25.2)

My invention relates to a device for mounting fishing tackle such as spare hooks and leaders which is adapted to be applied to fishing rods. It is the purpose of my invention to provide a simple sleeve which can be applied around the fishing rod adjacent to the handle and which mounts a multiplicity of tackle securing hooks into which the eyes of the fish hooks and the loops of the leaders can be readily inserted, together with resilient means urging the aforesaid hooks into overlapping relation with the sleeve. My invention is adapted to be used with split rings or other means spaced from the sleeve to which the fish hooks and leaders may be attached by pulling the hooks on the sleeve endwise out of the sleeve.

The nature and advantages of my invention will appear more fully from the following description and the accompanying drawings wherein a preferred form of the invention is shown. It should be understood, however, that the drawings and description are illustrative only and are not intended to limit the invention beyond the scope defined in the claims.

In the drawings:

Figure 1 is a side view showing a part of a fishing rod to which my invention is applied;

Figure 2 is an enlarged side view of the butt end of the fishing rod, showing my invention thereon, certain parts of the sleeve being broken away to illustrate the construction;

Figure 3 is an enlarged transverse sectional view taken on the line 3—3 of Figure 5 illustrating one sleeve construction;

Figure 4 is a sectional view taken on the line 4—4 of Figure 6, illustrating another sleeve construction;

Figure 5 is a fragmentary sectional view on a smaller scale, taken on the line 5—5 of Figure 3;

Figure 6 is a sectional view similar to Figure 5, taken on the line 6—6 of Figure 4;

Figure 7 is an enlarged side view of the hook used with the sleeve and leader mounting; and Figure 8 is an enlarged side view of the hook used with the sleeve for mounting eyed fish hooks.

My invention embodies a sleeve 10 which is preferably made up of two or more sections so that they may be clamped around a fishing rod and held together by a band 11. The sleeve has a multiplicity of fish hook receiving hooks 12 to which eyed hooks 13 may be attached. The sleeve also carries a plurality of hooks 14 for mounting leaders 15. The hooks 12 and 14 are useable at either end of the sleeve and quite obviously the hooks 12 may be used for receiving the loops 15a of the leaders 15 in the same manner that the hooks 14 are used. The principal difference between the hooks 12 and 14 being that the hooks 14 have upstanding eyes 14a at one end. Both the hooks 12 and the hooks 14 may be generically defined as tackle securing hooks.

The tackle securing hooks 12 and 14 are positioned at both ends of the sleeve 10, the hooked outer portion of each hook extending around a portion of the adjacent end of the sleeve 10 and the straight shank portion extending into the sleeve 10. The shank portions of hooks 12 and 14 located at opposite ends of the sleeve 10 are connected to each other by resilient members 16 which are shown in the present instance as loops of rubber. Other resilient members, of course, may be used within the scope of my invention. For example, in Figure 2 of the drawings, the resilient member 16a is a coiled metal spring.

In order to use my invention the fishing rod embodies split rings 17, 18 and 19 which are secured on the rod 20 by bands or wrappings 21, 22 and 23. The outer ends of the rings 17, 18 and 19 are flared out as shown in Figs. 1 and 2 so that the hooks 13—13a can be engaged in the flared out portion of the band.

Referring now to the sleeve 10, it will be noted that the sleeve is provided with longitudinally running exterior surface grooves 24 throughout its periphery. These grooves extend lengthwise of the sleeve on the outer surface thereof and in the bottom of each groove 24 there is a narrower groove 25 in which the hooks 12 and 14 seat. The function of the narrower groove 25 is to center the hook with respect to the wider groove 24 so that a leader loop 15a or a hook eye 13b can be engaged over the tip of the hook. Without the smaller groove 25 the tip of the hook 12 might lie too close to the wall of the groove 24 for easy engagement with a fish hook eye. In the form of the sleeve shown in Figures 3 and 5 of the drawings, the sleeve has passages 26 through it. These passages are apertures 26 directly inward from the grooves 24, and the hooks 12 and 14 extend into these apertures, the resilient members 16 being completely housed within the passages 26. In this construction the hooks 12 and 14 slide endwise in the apertures 26 when tension is applied to them to stretch the members 16. The hooks 12 and 14 are bent to the shape illustrated in Figures 7 and 8 so as to provide a bearing portion at 12a and 14c to ride in the smaller groove 25. The hooks are removably fastened to the resilient members 16—16a by making reverse bends 12b and 14b in the ends of the shanks of the hooks with which the members 16—16a are engaged.

In the form of the invention illustrated in Figures 4 and 6 of the drawings, the passages 26a are enlarged and opened to the interior of the sleeve 10a to leave ribs 27 to engage the rod 20. It is evident that there may be one or less passages 26a per groove 24. This makes a simpler construction and permits a more ready replacement of the resilient members 16—16a. Where rubber bands are used for the resilient members it may be necessary to replace them frequently and in such an event it is only necessary to remove the band 11 and open up the two sections of the sleeve 10a to have access to all of the members 16 for replacement. In the form of the invention shown in Figures 3 and 5, the interior surface of the sleeve 10 makes snug engagement with the rod throughout its circumference, which to some users, may be more desirable. The band 11 and the bands 21, 22 and 23 may be of any suitable material. A wrapping of plastic tape has been found to be satisfactory. The material of the sleeve 10 may be varied. A light metal casting such as aluminum is very satisfactory and of course the sleeve may be molded of synthetic resins or other plastic molding composition.

It is believed that the nature and advantages of my invention will be apparent from the foregoing description and the accompanying drawings. With this device a total of sixteen hooks are available for attaching leaders and fish hooks. If more grooves 24 are provided then there will be a place for additional hooks made available. When the split rings 17, 18 and 19 are properly placed with respect to the sleeve 10, the fisherman can have snelled flies with the proper length of leader attached and additional flies without leader attached, always available on his rod. The added weight of the entire device is not sufficient to make any appreciable unbalance of the rod. The hooks 12 and 14, and the sharp ends of the hooks 13, are all positioned so that they cannot engage and catch on the clothing of the user so that the use of the fishing rod is not at all impaired by the addition of my accessory tool.

Having thus described my invention, I claim.

1. A fish hook and leader mounting device adapted for mounting on a fishing rod comprising a sleeve having longitudinally running surface grooves on the exterior thereof adjacent to its ends, tackle securing hooks at both ends of said sleeve, each of said hooks having an outer hooked portion seated in one of said grooves and extending around a portion of the adjacent end of the sleeve and having a shank portion extending into the sleeve, and a resilient member connecting the shank portion of a hook extending into the sleeve from one end thereof with the shank portion of a hook extending into the sleeve from the other end thereof and yieldingly opposing movement of both shank portions connected thereto out of the sleeve.

2. A fish hook and leader mounting device adapted for mounting on a fishing rod comprising a sleeve, means to clamp the sleeve around a rod, tackle securing hooks at both ends of said sleeve, each hook having an outer portion extending lengthwise of the sleeve on the exterior surface thereof, and around a portion of the adjacent end of the sleeve, each hook having a securing shank portion extending into the sleeve from said outer portion, and a resilient member enclosed by the sleeve connecting a securing shank portion of one hook extending into the sleeve from one end thereof with a securing shank portion of another hook extending into the sleeve from the other end thereof and yieldingly opposing movement of the portions connected thereto out of the sleeve.

3. A fish hook and leader mounting device adapted for mounting on a fishing rod comprising a sleeve, means to clamp the sleeve around a rod, tackle securing hooks at both ends of said sleeve, each hook having an outer portion extending lengthwise of the sleeve on the exterior surface thereof, and around a portion of the adjacent end of the sleeve, said sleeve having interior passages extending therethrough from one end to the other, each hook having a securing shank portion extending into one of said passages from said outer portion, and a resilient member in the same passage connecting a securing shank portion of one hook extending into the passage from one end thereof with a securing shank portion of another hook extending into the passage from the other end thereof and yieldingly opposing movement of the securing shank portions connected thereto out of the passage.

4. A fish hook and leader mounting device adapted for mounting on a fishing rod comprising a sleeve, means to clamp the sleeve around a rod, tackle securing hooks at both ends of said sleeve, each hook having an outer portion extending lengthwise of the sleeve on the exterior surface thereof, and around a portion of the adjacent end of the sleeve, said sleeve having passages extending therethrough from end to end thereof, and a resilient member in each passage, each hook having a securing shank portion attached to one of said resilient members whereby to oppose movement of the hooks endwise away from said sleeve.

5. A fish hook and leader mounting device adapted for mounting on a fishing rod comprising a sleeve, means to clamp the sleeve around a rod, tackle securing hooks at both ends of said sleeve, each hook having an outer portion extending lengthwise of the sleeve on the exterior surface thereof, and around a portion of the adjacent end of the sleeve, said sleeve having apertures extending endwise through it, and a resilient member in each aperture, each hook having a securing shank portion extending into an aperture and connected to the resilient member therein whereby to oppose endwise movement of the hooks away from said sleeve.

6. A fish hook and leader mounting device adapted for mounting on a fishing rod comprising a sleeve, means to clamp the sleeve around a rod, tackle securing hooks at both ends of said sleeve, each hook having an outer portion extending lengthwise of the sleeve on the exterior surface thereof, and around a portion of the adjacent end of the sleeve, said sleeve having passages extending therethrough from end to end thereof, and a resilient member in each passage, each hook having a securing shank portion attached to one of said resilient members whereby to oppose movement of the hooks endwise away from said sleeve, the sleeve having longitudinally running grooves in its exterior surface in which the outer portions of said hooks rest.

7. A fish hook and leader mounting device adapted for mounting on a fishing rod comprising a sleeve, means to clamp the sleeve around a rod, tackle securing hooks at both ends of said sleeve, each hook having an outer portion extending lengthwise of the sleeve on the exterior surface thereof, and around a portion of the adjacent end of the sleeve, said sleeve having passages extending therethrough from end to end thereof, and a resilient member in each passage, each hook having a securing shank portion attached to one of said resilient members whereby the latter will oppose movement of the hooks endwise away from said sleeve, the sleeve having longitudinally running grooves in its exterior surface, the central portions of which are narrowed and deepened to center the outer portions of the hooks therein, said outer portions of the hooks having upturned ends projecting above the deepened central portions to receive the eye of a fish hook.

No references cited.